Feb. 7, 1956     L. W. STORM     2,733,599
TRAVELING BLOCK POSITION AND VELOCITY RECORDER
Filed April 13, 1953     4 Sheets-Sheet 1
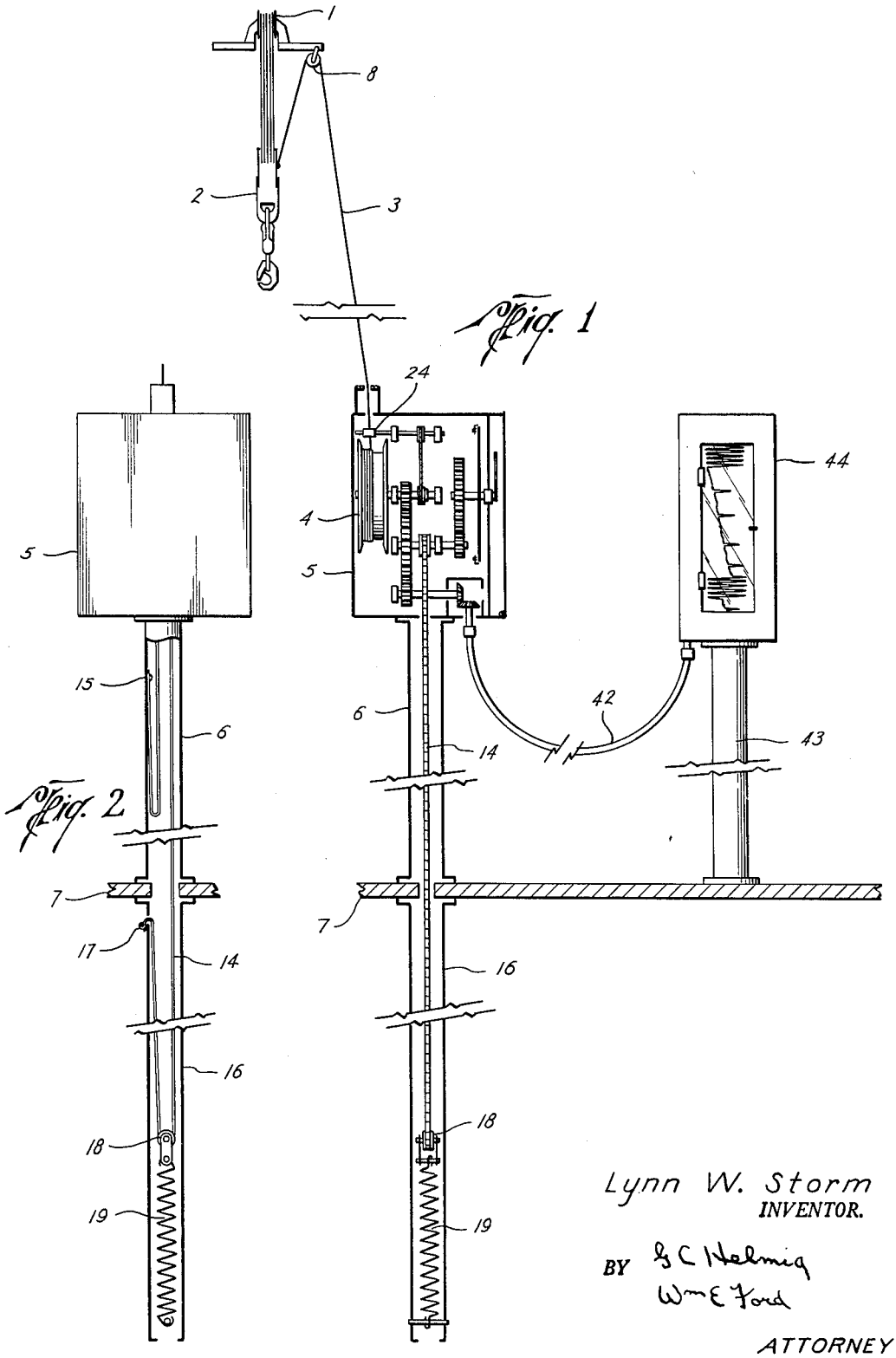
Lynn W. Storm
INVENTOR.
BY G C Helmig
Wm E Ford
ATTORNEY Feb. 7, 1956 L. W. STORM 2,733,599
TRAVELING BLOCK POSITION AND VELOCITY RECORDER
Filed April 13, 1953 4 Sheets-Sheet 2

Lynn W. Storm
INVENTOR.

BY G.C. Helmig
Wm E. Ford
ATTORNEY

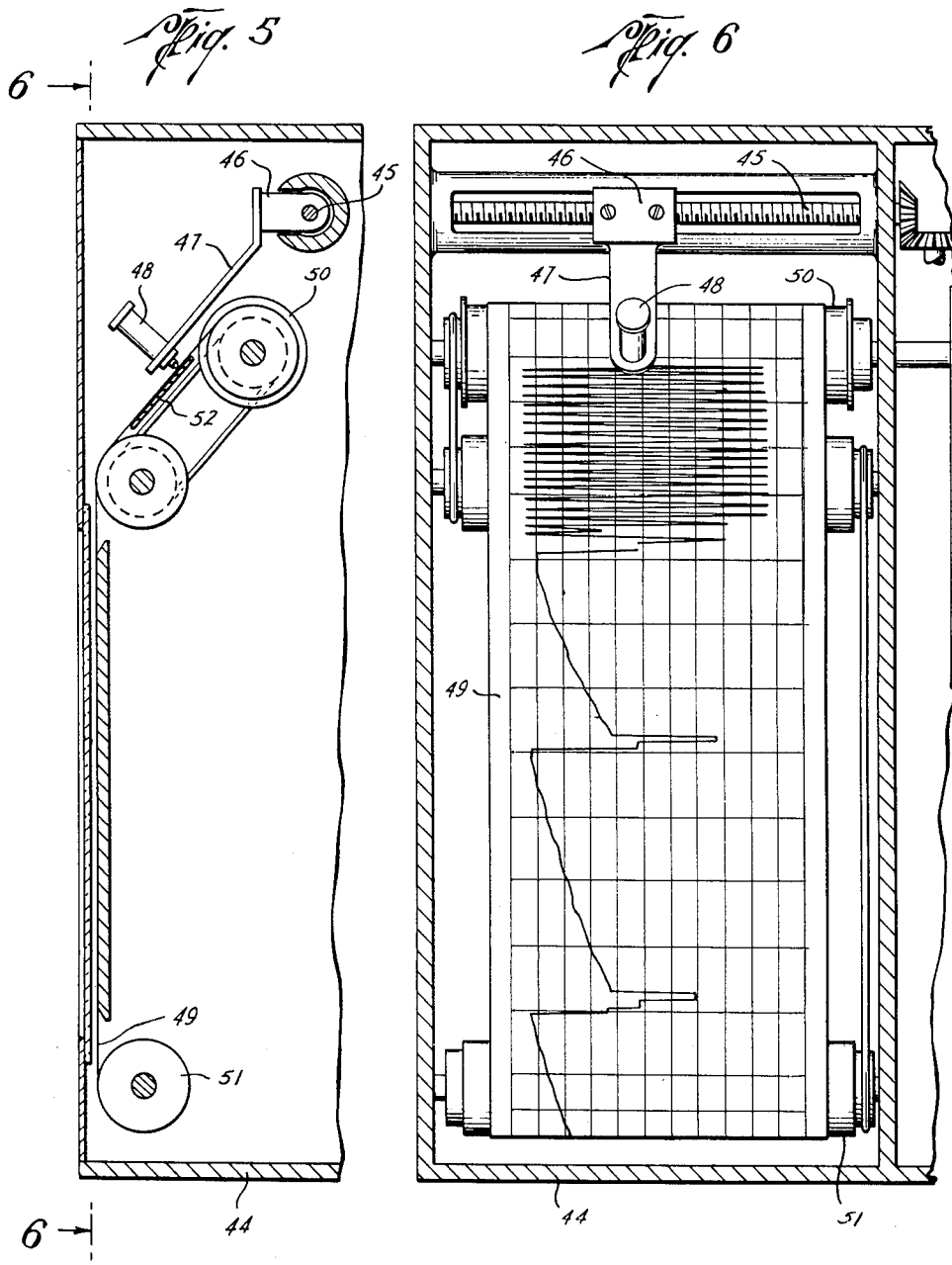

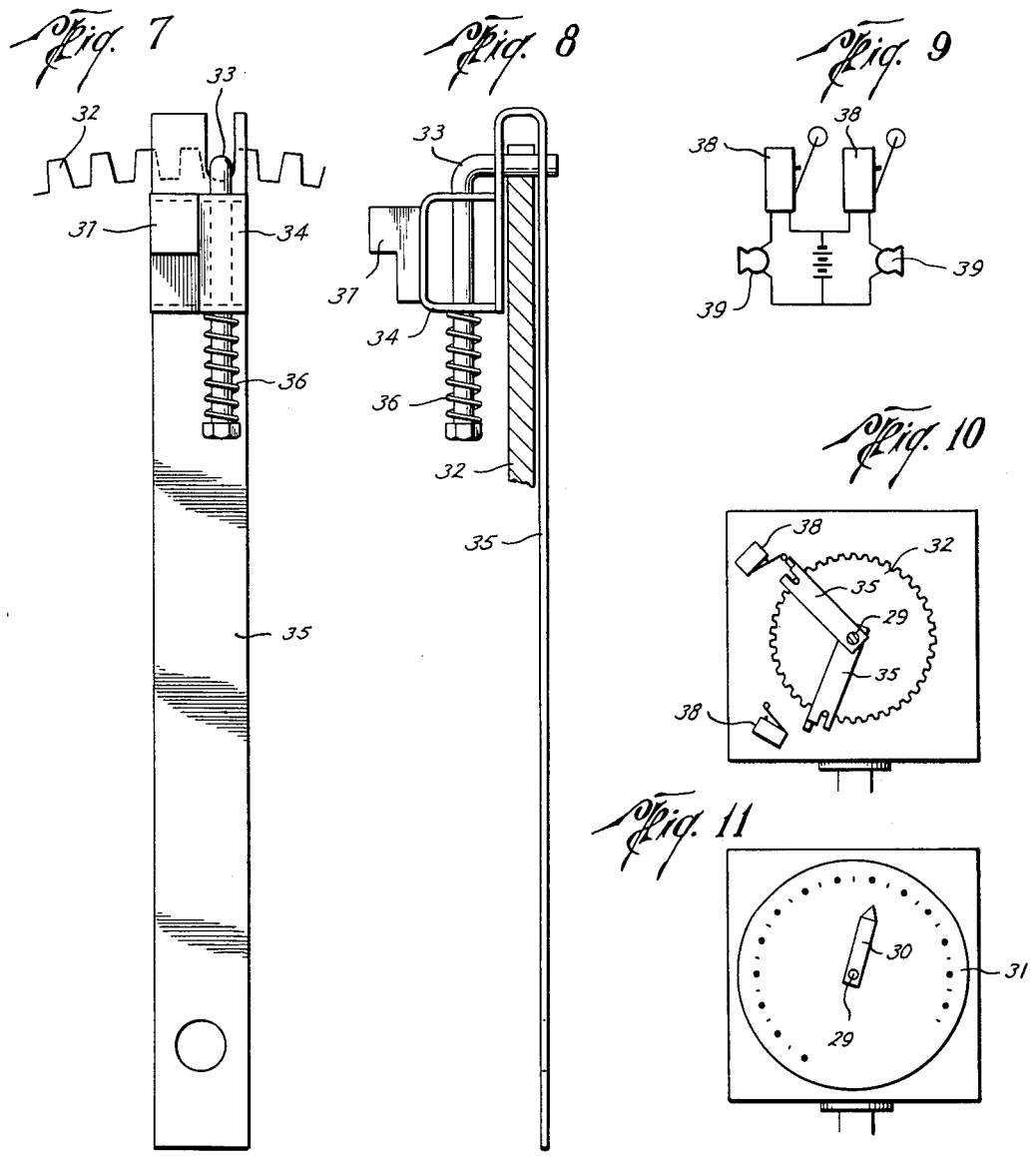

United States Patent Office 2,733,599
Patented Feb. 7, 1956

2,733,599
TRAVELING BLOCK POSITION AND VELOCITY RECORDER

Lynn W. Storm, Austin, Tex., assignor, by mesne assignments, to Warren Automatic Tool Company, Houston, Tex., a corporation of Texas Application April 13, 1953, Serial No. 348,356

1 Claim. (Cl. 73—151.5)

This application is a continuation in part of patent application, Serial No. 44,128, filed August 13, 1948, which has matured into Patent No. 2,688,249, dated September 7, 1954.

In oil field drilling operations it is desirable to have a record of the operations and progress made in the drilling of each well. It is also helpful in the interests of safety to reduce the effort of the workmen in charge of the power equipment by having a visual and/or audible indication readily available to the workmen at all times of traveling block position and selected points in its range of travel. To provide improved mechanism for such purposes is one of the objects of the present invention.

A further object of the invention is to provide an arrangement involving a given length of flexible cable whose opposite ends are joined respectively to the traveling block and a cable-retrieving drum, the latter having associated with it a cable guide to prevent overlapping in the cable windings and thereby insure accurate measurement of a length of cable carried on the drum diameter as reflecting the height of the traveling block.

Another object of the invention is to provide a single cable layer-winding drum with a drum rotation-responsive indicator closely adjacent or at the work station of, and for observation by, the operator in control of the power equipment, and with another drum rotation-responsive indicator of a recording type located at a remote, out of the way, and safe point where it does not interfere with the well drilling mechanism and is protected against likelihood of injury.

It is a further object of the invention to provide a compact assembly of readily obtainable parts which will be simple in construction, positive and accurate in action, unlikely to get out of repair or require attention, and easy to install at low cost.

Other and further objects will be apparent when the specification is considered in connection with the drawings, in which:

Figure 1 is an elevation, with parts in section, of a traveling block position-indicating apparatus;

Fig. 2 is a side elevation, partly in section, of the main housing shown in Fig. 1;

Fig. 5 is an enlarged sectional elevation of the recorder;

Fig. 6 is a sectional view taken along line 6—6 of Fig. 5;

Fig. 7 is an enlarged elevation of an adjustable trigger device for actuation of an audible signal at a selected point in the range of block travel;

Fig. 8 is a sectional side elevation of the parts shown in Fig. 7;

Fig. 9 is a diagram of the warning alarm circuit;

Fig. 10 is an elevation from the back of a visual indicator; and

Fig. 11 is a front elevation showing the visual indicator.

Figure 3:
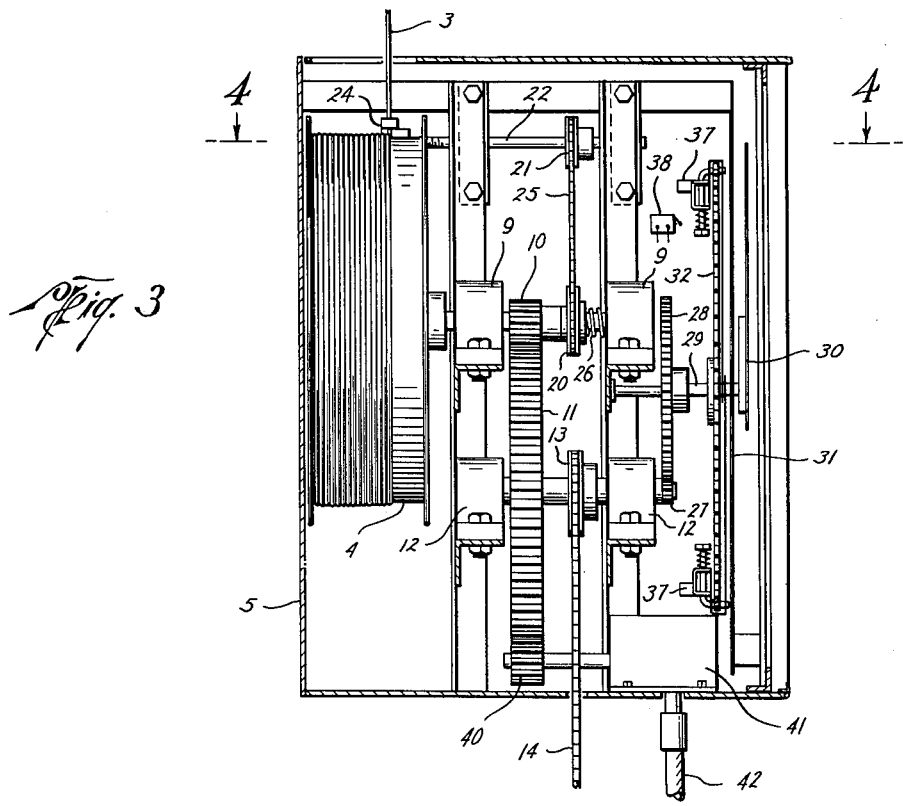
Fig. 3 is a section through the housing showing the line metering drum and the adjacent transmission as in Fig. 1 but on a larger scale.
Figure 4:
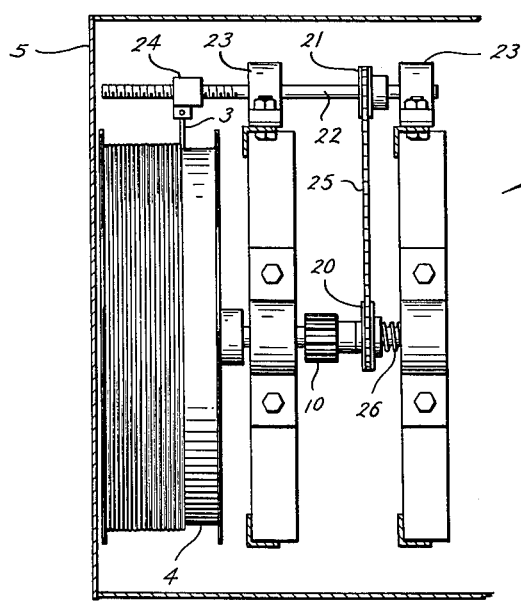
Fig. 4 is a top plan view of the drum looking in the direction of the arrows on line 4—4 of Fig. 3.

Referring to the drawings, the reference numeral 1 indicates the usual sheave at the top of an oil drilling derrick, which suspends a traveling block 2 by means of a power-operated cable. For the sake of simplicity, the derrick and other parts of a conventional well drilling rig are not illustrated in the drawing, and it will be understood that the traveling block suspends the piping and drilling equipment, and is lowered as the drilling proceeds. It is repeatedly raised and lowered for adding pipe sections or for pulling pipe out of the well, and for the various other operations incident to well drilling, and its use is the critical indicator of the occurrences and the timing of the numerous operations from the start to the completion of the well. It is here proposed to utilize the back and forth travel or more particularly the range and rate of travel of each successive stroke of the traveling block, for recording the history of the well drilling operation. For transmitting the record of work performed by the traveling block to suitable indicating mechanism, it is here proposed to employ a flexible line or cable 3 joined at opposite ends, respectively, to the traveling block 2 and to a cable-retrieving drum 4 arranged to hold a predetermined length of line, corresponding to the maximum range of travel of the traveling block 2. The drum 4 may be protectively encased within a housing 5 conveniently supported on a pedestal 6 extending upwardly from a work platform 7. When the drum is so located it will be necessary to run the cable through one or more pulleys, such as that shown at 8 at the top of the derrick.

The cable-retrieving drum is fixed to a shaft rotatably mounted in bearings 9—9 in the housing 5, and the shaft has keyed on it a pinion 10 in constant mesh with a gear 11 keyed to a countershaft which is mounted in the housing 5 by a pair of spaced bearings 12—12. A sprocket 13 is fixed to the countershaft and has looped about it a chain 14 which hangs downwardly and is housed within the hollow pedestal 6. On one side the chain may simply hang loosely in the pedestal, but, as shown in Fig. 2, it preferably is secured, as at 15, to the wall of the pedestal 6. Because of the length of the cable 3, together with the diameter of the drum and the ratio of the gears and the force to be transmitted, the over-all length of the chain 14 may be such that it will be desirable, as shown in the drawing, to mount a tube or housing 16 from the bottom of the platform 7 and in alignment with the tubular pedestal 6 in order to complete the housing or enclosure of the chain 14. The end of the chain opposite to that fastened at 15 is anchored at 17 to the tubing, and between the anchor 17 and the sprocket 13 the chain passes around the pulley 18, which is shackled to the free end of a coil spring 19 whose lower end is suitably anchored at the bottom of the tubular housing 16. By reason of the spring 19, a yieldable force is exerted at all times on the drum in the direction for winding the flexible cable 3 for keeping it taut. Thus upon descent of the traveling block 2 the cable 3 will unwind from the drum against the resistance of the spring 19, and upon elevation of the traveling block 2 the cable 3 will be retrieved or wound upon the drum as the drum rotates under the spring-exerted force transmitted through the chain 16 to the sprocket 13 and gears 10 and 11.

To insure that the cable will always be wound upon the fixed diameter of the drum, a lead-in guide mechanism is provided so that the cable being wound will follow across the drum cylinder in a single layer. Such mechanism is shown in the drawing as including a driving gear 20 for rotation with the drum 4 and a driven gear 21 fixed on a shaft 22 having rotatable bearing supports 23—23. One end of the shaft 22 projects across the width of the drum 4 and is provided with a feed thread with which is engaged the internal threads of the traveling nut 24 having an apertured extension through which the cable 3 is threaded. In the event the gears or sprocket wheels 20 and 21, interconnected by the drive chain 25 are of the same ratio, then the pitch of the threads on the nut 24 and the shaft 22 would be such that for one revolution of the shaft the nut travels transversely a distance at least as great as the thickness of the cable 3. This will insure the winding of successive cable coils on the drum in side-by-side relation. Thus the diameter and the width of the drum must be selected to hold the entire length of the cable 3 corresponding to the distance between the opposite limits of travel of the block 2. Optionally, the leads of the interengaged threads may be greater or less than the thickness of the cable 3 by selecting proper ratios for the driving and driven sprockets 20 and 21. Also, it will be desirable to provide the hubs of the gears 10 and 20 with slider jaw teeth which can be held in clutch engagement by coil spring 26 which bears on the hub of the gear 20 and urges it toward the gear 10. The disengageable clutch driving connection will be convenient for setting up the equipment and adjusting it for use.

As viewed in Fig. 3, the right-hand end of the countershaft carries a drive pinion 27 in constant mesh with a driven gear 28 fixed on a shaft 29 supported in suitable bearings in the housing 5. At its forward end this shaft 29 mounts a pointer arm 30 which swings over the face of a gauge 31 having suitable indicia thereon. If, for example, the normal travel range of the traveling block 2 is on the order of 120 feet, the scale may be graduated between zero feet and 120 feet, and by proper selection of gear ratio the pointer will turn with drum rotation and afford a visual indication at all times of the amount of cable 3 carried on the drum diameter; or, in other words, it will indicate the vertical height of the traveling block 2.

Immediately behind the indicator face 31 there is located within the housing a wheel or disk 32 fixed on the shaft 29, and which disk may be a sheet metal stamping provided in its periphery with a series of spaced slots between projecting teeth, as is best seen in Fig. 7.

The open spaces between the projecting teeth are provided for the selective reception of a lateral foot of an L-shaped locking rod 33 which is rotatably, slidably mounted in the bracket 34 carried by an adjustable arm 35 whose inner end is apertured to fit the shaft 29. A coil spring 36 interposed between the bracket and abutment head on the locking part 33 resiliently urges the locking bar inwardly and resists displacement in relation to the disk 32. Also carried by the bracket 34 is an outstanding lug or trigger 37 whose path of movement with the disk 32 will engage with a switch-operating element to close the contact of an electrical switch, one of which is shown at 38 in Fig. 3. When closed, the switch will direct the electric current to a sound signal. Thus by setting the arm 35 in various angular positions with respect to the shaft 25, the signal may be sounded at any desired position of the traveling block 2 in its range of travel. By preference a pair of audible signals and switch-operating arms may be provided, as indicated particularly in Figs. 9 and 10, and these may, if desired, be set, for example, so that one signal is operated as the traveling block 2 approaches in close proximity to the crown of the derrick while the other signal is actuated when the traveling block reaches a point toward the opposite limit of its travel. Referring particularly to Fig. 9, it will be seen that two parallel circuits are illustrated, connected with the source of power, such as a battery, and each circuit including a switch 38 and a sound signal 39.

The housing 5 also provides a mounting for a power take-off unit which includes a gear 40 in mesh with the gear 11 to drive suitable worm or bevel gearing contained within a unit 41 and to which is connected a flexible drive cable 42 of any desired length for driving a recording mechanism located at some distance from the power mechanism. For convenience, Fig. 1 illustrates the recorder supported by a pedestal 43 and enclosed within a housing 44. If desired, the recording mechanism may be accessible through a glass door, which also constitutes an observation opening. The flexible drive cable 42 is joined by bevel gearing to a rotatable shaft 45, as best seen in Fig. 6, and the shaft is screw-threaded for driving a nut 46 in a transverse direction. The nut projects through a slot in a supporting tube and terminates in an angular arm 47 which carries a marker or stylus 48. This stylus is arranged to operate upon a band of graph paper 49, which is supplied from a roller 50 and is received by a roller 51. Between the feed and wind-up rollers the paper passes over a flat plate 52 directly beneath the point of the stylus, and then downwardly across the face of the observation opening in the box 40. Ordinary spring-wound clock mechanism may be used to feed the paper forward under the stylus. Thus the length of the paper will give an indication of time, and the transverse markings will indicate the up and down travel of the traveling block 2. Accordingly a line on the graph paper which approaches the vertical will indicate descent of the traveling block during a drilling operation, and the rate of speed at which the drilling advances. Lines which are more nearly horizontal will indicate a rapid up or down travel such as is likely to occur when pipe sections are being pulled.

What is claimed is:

In a recorder of the working operation through successive cycles of a well rig traveling block, a self retracting winding drum, recording mechanism responsive to drum rotation to indicate rate and range of drum rotation in both winding and unwinding directions, a block connected line of such length and width in relation to the drum diameter and width as to be receivable on the drum peripheral surface in single layer side by side uniform diameter winds when the drum is fully retracted, a line guide movable across the face of the drum to compel side by side line windings and whose range of travel is in proportion to the total length of line windings in following the travel range of said block, and a drive connection between the line guide and said drum including a spring engaged clutch which releasably establishes the drive connection for initial adjustment.

References Cited in the file of this patent

UNITED STATES PATENTS

| | | |
|---|---|---|
| 868,844 | Connor | Oct. 22, 1907 |
| 2,006,531 | Arntzen | July 2, 1935 |
| 2,166,212 | Hayward | July 18, 1939 |
| 2,475,983 | Osgood | July 12, 1949 |
| 2,565,951 | Crookston | Aug. 28, 1951 |
| 2,573,640 | Connors | Oct. 30, 1951 |